US010190902B2

(12) United States Patent
Billings

(10) Patent No.: US 10,190,902 B2
(45) Date of Patent: Jan. 29, 2019

(54) LOW WATER SENSOR TESTING APPARATUS

(71) Applicant: Craig W. Billings, Pittsford, VT (US)

(72) Inventor: Craig W. Billings, Pittsford, VT (US)

( * ) Notice: Subject to any disclaimer, the term of this patent is extended or adjusted under 35 U.S.C. 154(b) by 79 days.

(21) Appl. No.: 15/530,632

(22) Filed: Feb. 9, 2017

(65) Prior Publication Data
US 2018/0224320 A1   Aug. 9, 2018

(51) Int. Cl.
G01F 25/00 (2006.01)
F24D 3/02 (2006.01)
F24D 19/10 (2006.01)

(52) U.S. Cl.
CPC ........... *G01F 25/0061* (2013.01); *F24D 3/02* (2013.01); *F24D 19/1009* (2013.01); *F24D 2220/048* (2013.01); *F24D 2220/08* (2013.01)

(58) Field of Classification Search
CPC .... G01F 25/0061; F24D 3/02; F24D 19/1009; F24D 2220/048; F24D 2220/08
USPC .......................................................... 73/1.73
See application file for complete search history.

(56) References Cited

U.S. PATENT DOCUMENTS

| 793,512 A | 4/1958 | Rowell |
| 3,831,429 A * | 8/1974 | Kmiecik ............. G01F 25/0061 137/460 |
| 3,834,357 A | 9/1974 | Kaczmarek et al. |
| 4,066,858 A | 1/1978 | Piper et al. |
| 4,274,390 A | 6/1981 | Azuma |
| 4,465,088 A | 8/1984 | Vosper |
| 4,556,168 A | 12/1985 | Romanow et al. |
| 4,727,826 A | 3/1988 | Draper et al. |
| 5,076,321 A | 12/1991 | Terry |
| 5,582,236 A | 12/1996 | Eike et al. |
| 5,632,300 A * | 5/1997 | Isringhausen ......... F16L 41/023 137/269 |
| 5,671,771 A | 9/1997 | Brandel |
| 6,073,591 A | 6/2000 | Theriault |
| 6,964,278 B2 | 11/2005 | Tschanz |
| 7,409,301 B2 | 8/2008 | Tynkov |
| 7,802,430 B1 | 9/2010 | Sha |
| 7,954,506 B2 | 6/2011 | Swan |
| 7,992,527 B2 | 8/2011 | Merwin |
| 8,091,793 B2 | 1/2012 | Kempf et al. |
| 8,108,953 B2 | 2/2012 | Zeng |
| 9,329,069 B2 * | 5/2016 | Custer ..................... G01F 23/00 |
| 9,546,897 B1 * | 1/2017 | Miller ................. G01F 25/0007 |

(Continued)

*Primary Examiner* — Son Le
*Assistant Examiner* — Marrit Eyassu
(74) *Attorney, Agent, or Firm* — John J. Welch, Jr., Esq.

(57) ABSTRACT

A low water sensor testing apparatus consisting of a 2 piece threaded steel ball valve unit with spring loaded handle connected at one end cavity portion thereof to initial piping emanating from a hot water boiler and connected at the second end cavity portion thereof to an equivalent adapter unit in turn connected to the first end segment of an E-shaped piping unit having its first stem portion connected to a ball valve unit via another adapter unit, its second stem portion connected via yet another adapter unit to a low water sensor unit and, with the second end segment of the E-shaped piping unit being connected to another equivalent adapter unit in turn connected to the first end cavity portion of a three way purge valve unit being connectable within the second cavity end portion thereof to outflow piping leading to a structure's heating system.

28 Claims, 8 Drawing Sheets

(56) References Cited

U.S. PATENT DOCUMENTS

Figure 1:
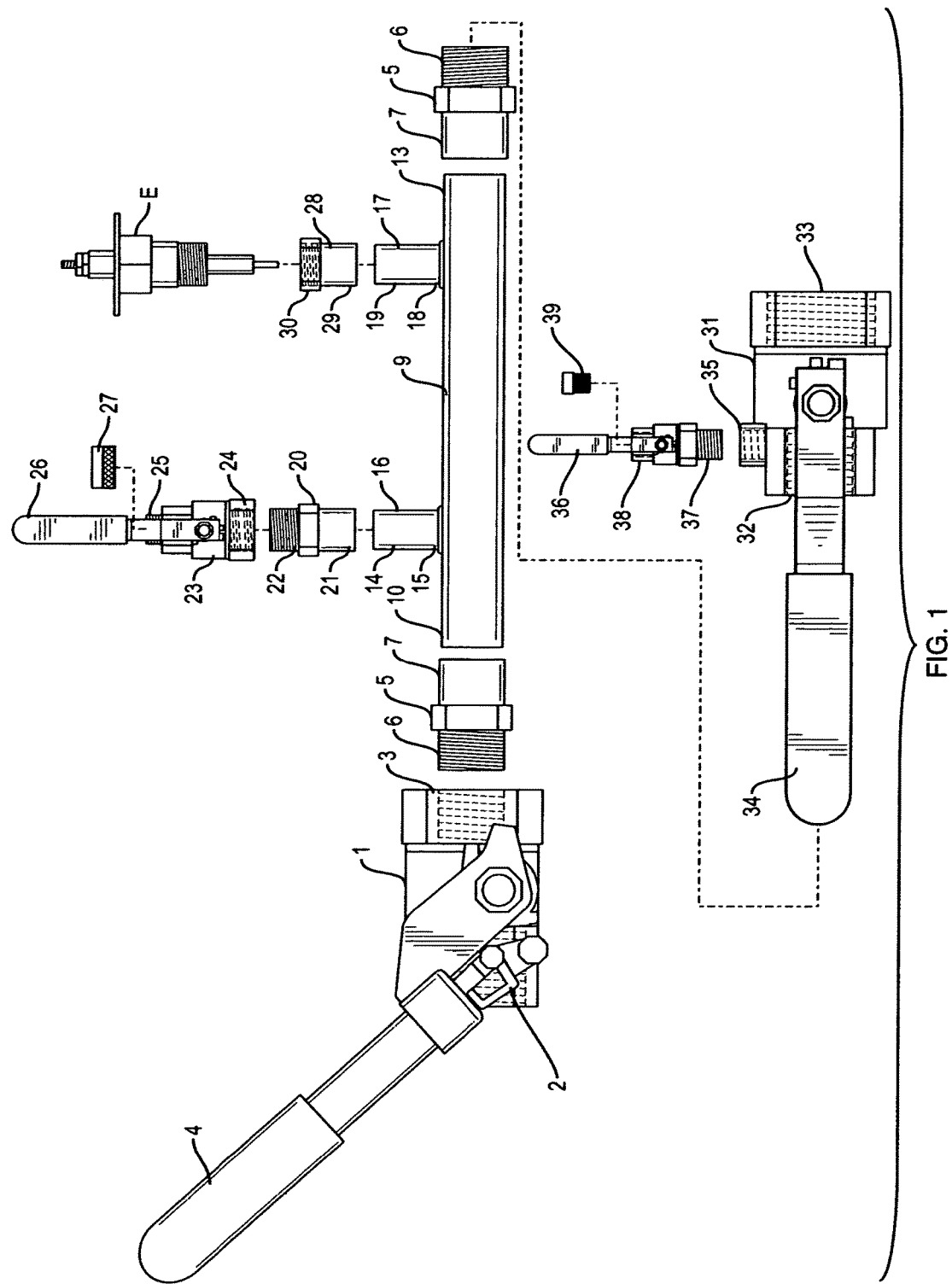

2010/0280665 A1    11/2010  Fildes et al.
2010/0319795 A1*   12/2010  Olsen .................... F16K 11/22
                                                          137/597
2013/0200168 A1     8/2013  Buescher et al.

* cited by examiner

LOW WATER SENSOR TESTING APPARATUS

PRIOR OR PARENT APPLICATIONS

There are no prior or parent applications as relate to the herein described invention. There is however a pending patent application having been submitted on behalf of your Inventor, Craig W. Billings with filing date: Feb. 17, 2016 and Ser. No. 14/998,8785

FEDERALLY SPONSORED RESEARCH AND DEVELOPMENT

There is no federally sponsored research or development as relates to the herein described invention.

BACKGROUND OF THE INVENTION

A: Field of the Invention

The invention relates to those devices serving to test for low water levels in hot water boiler units that operate to provide heat within residential and commercial buildings.

B: Prior Art

There is no prior art known to Applicant that anticipates the present invention. The herewith submitted Informational Disclosure Statement reflects art that is within the field of the field of the invention, but, which does not anticipate the present invention.

SUMMARY OF THE INVENTION

A: A Brief Description of the Invention

The invention consists of a 2 piece threaded steel ball valve unit with spring return. component. This unit is featured by an internally threaded first end cavity portion amenable to threadably receiving external threading about a distal end segment of initial piping connected to a hot water boiler unit located within a commercial structure. Such threadable connection is direct as respects initial piping made of, e.g., iron, the diameter of which is typically larger than such initial piping made up of copper. Copper initial piping is often found emanating from such boiler units within e.g., a residential structure. In the case of such copper based initial piping, such connection is achieved indirectly with resort to the utilization of an initial hollow adapter unit with external threading about a first end portion thereof. The second end portion thereof is soldered to the distal end segment of such copper based initial piping. The first end portion thereof is threadably received via the internal threading within the first end cavity portion of the 2 piece threaded steel ball valve unit. An internally threaded second end cavity portion of the above mentioned ball valve unit is amenable to threadably receiving the externally threaded first end portion of the first of two equivalent hollow main connector adapter units. The second end portion of this adapter unit is soldered to the first end segment of the elongated body portion of the E-shaped piping unit of the invention. This body portion has two holes located within it. The inner end segments of each of two, a first and a second, stem portions of the E-shaped piping unit are soldered to the body portion at and about the locations of each such hole respectively. The first small and the second small hollow adapter units of the invention are soldered, one each, at first end portions of each, to each of the stem portions respectively. The first small adapter unit features an externally threaded second end portion serving to threadably receive an internally threaded first end cavity portion of a small ball valve unit of the invention. This latter ball valve unit is amenable to receipt of an externally threaded drain cap unit that is threadably received within an internally threaded second end cavity portion of this ball valve unit. The second small adapter unit is internally threaded within the second end portion thereof for purposes of threadably receiving external threading about the body of a low water sensor unit. The second end segment of the body portion of the E-shaped piping unit is soldered to the second end portion of a second equivalent hollow main connector adapter unit. The first end portion of the second equivalent adapter unit is externally threaded for purposes of being received by internal threading within the first end cavity portion of the three way purge ball valve unit of the invention. The internally threaded second end cavity portion of this latter ball valve unit is amenable to threadably receiving the externally threaded first end portion of yet another hollow adapter unit. As respects resort to utilization of this latter adapter unit, its second end portion is soldered to a non-threaded proximal end of outflow piping leading to the heating system within a building structure in situations where such outflow piping is made of copper. This latter adapter unit like all of the previously mentioned adapter units is typically, though not necessarily, wholly made of copper. Such an adapter unit is however not necessary for use when such outflow piping is made of iron with a typically larger piping diameter than that of outflow piping made of copper. Such iron based outflow piping can be externally threaded about the proximal end thereof to thereby be threadably received directly within the internally threaded second end cavity portion of the three way purge ball valve unit.

B: Object of the Invention

It is well known that persisting low water levels within the innards of a powered up hot water boiler unit can invariably beget catastrophic consequences for the owners of such a unit. Such low water levels can occur, for example, in instances where a feeding valve permitting the flow of water into such a unit becomes defective, i.e., notably, partially shut. Such low water levels will ultimately serve to prompt the formation of steam within the inner region of the boiler unit, steam that once having accumulated to a sufficient volume can then prompt an explosion of the boiler unit. For this reason, such boiler units also have emergency relief valves that are triggered in the event of the presence of excess steam within the unit. Such triggering however invariably results in steam and water damage about the exterior region of the boiler unit. For this reason, boiler units are also equipped with low water sensor systems. Such sensor systems consist of an electro-sensor component unit, the end sensor portion of which is located within the outflow water piping conjoined with and leading from the boiler unit. The sensor system features a low water cut off switching device. The switching device serves to shut off power to the boiler unit, in effect shutting it down, once it would have developed that the water level within the operating boiler unit would have become low enough to cause steam to commence notably forming within the boiler unit in the event that the boiler unit were to otherwise remain so powered up. Low water within the boiler unit is reflected by a lack of water within the outflow piping leading from the boiler to the zones of heating within the structure served by the boiler, to wit, no water, but, rather instead steam being accordingly found in the vicinity of the sensor unit positioned within said outflow piping. Such a low water event causes activation of the sensor, if properly functioning, which in turn operates to shut down power to the boiler unit thereby obviating continued heating of any water found within the boiler unit which in turn prevents the continuing development of any steam within the boiler unit.

However, there are times when the sensor unit itself may be defective, non-operable to the extent that any such low water level would accordingly go undetected say, at times when the building or dwelling, within which the boiler unit is located, remains wholly unoccupied. Such inoperability would lead to continuous steam build up in the event of low water levels within the boiler unit leading to one or potentially more continuous blow offs of steam and concomitantly progressive water damage about the exterior portion of the boiler unit, or, much worse, an explosion, in the event that, for whatever reason, the relief valve system serving the boiler would, likewise, itself, somehow, also be then defective as well.

In view of the foregoing, it is necessary to periodically test the integrity of the low water sensor unit serving the boiler. Such testing is however currently cumbersome and clearly very time consuming. To begin with, such testing requires drainage of the water, all of the water within the heating system within the building housing the boiler. This takes a goodly amount of time to accomplish, and; then, with such drainage, once the water level within the boiler recedes sufficiently, the sensor unit will be triggered, and; the boiler will be powered off, provided that the sensor unit is then properly functioning. If, on the other hand, the sensor unit is not then properly functioning, the boiler unit will continue to run in the absence of sufficient water within the boiler, thereby indicating that the sensor unit is, itself defective and accordingly in need of repair or replacement. At any rate, once the integrity of the sensor unit will have been evaluated, then, either repaired, replaced or, if properly functioning, then; simply left alone, it then becomes necessary to bring about a refilling of the whole of the water content within the whole of the heating system within the building, involving yet more time and effort on the part of the persons charged with so testing the integrity of the sensor unit. Such doings also require at least two persons expending numerous hours in terms of the time required in an effort to accomplish such testing.

The present invention, on the other hand, serves to provide a very simple, quick and ready means for so testing the integrity of a low water sensor unit. Initial piping emanating from a hot water boiler unit and equipped with the invention is readily amenable to such simple, quick and ready testing and by only one person and within a spance of, at most, only a few minutes of time.

However, it also necessary to be reasonably certain that with resort to utilization of an invention such as the presently disclosed invention, that, once testing as aforesaid would have been completed, the system serves to, at once, once again, allow for the free flow of hot water from the boiler unit to and through outflow piping leading to the heating system within the building structure within which the hot water boiler unit would be located. From a purely safety based vantage point, forgetful failure on the part of a testing person to facilitate the free flow of water to the outflow piping, once testing would have been consummated, would clearly result in a dire consequence within a boiler unit continuously filing with water being therein heated. This concern is readily addressed by virtue of the existence of the spring loaded handle feature of the two-piece threaded steel ball valve unit of the invention. The handle must be rotated through an angle and then held in a closed position during testing thereby impeding the flow of hot water from the boiler unit during the very brief period when testing would be taking place. Once testing is complete, the hold on the handle is simply released and the handle then via spring action simply defaults to a so-called initially open position thereby quickly allowing water from the boiler unit to again flow freely to and through the E-shaped piping unit of the invention and further to and through the valvularly readjusted three way purge ball valve unit and then to and through the outflow piping.

In view of the foregoing, it is, respectfully submitted, readily apparent that the present invention is not merely new and unique but indeed unquestionably useful.

A DESCRIPTION OF THE DRAWING

Figure 2:
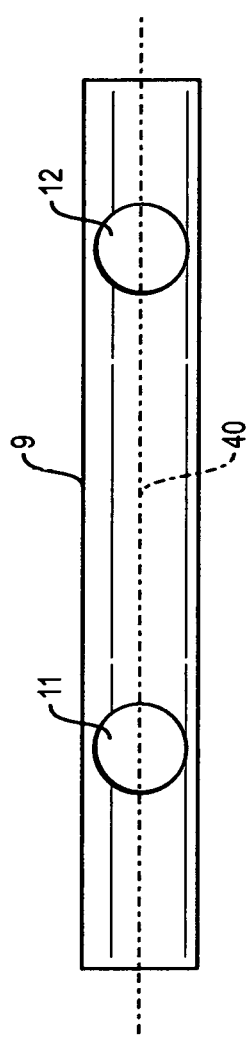
Figure 3:
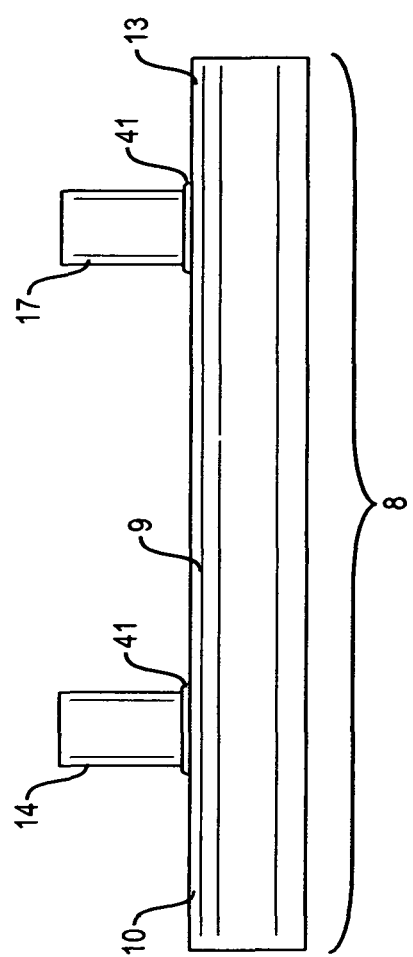
Figure 4:
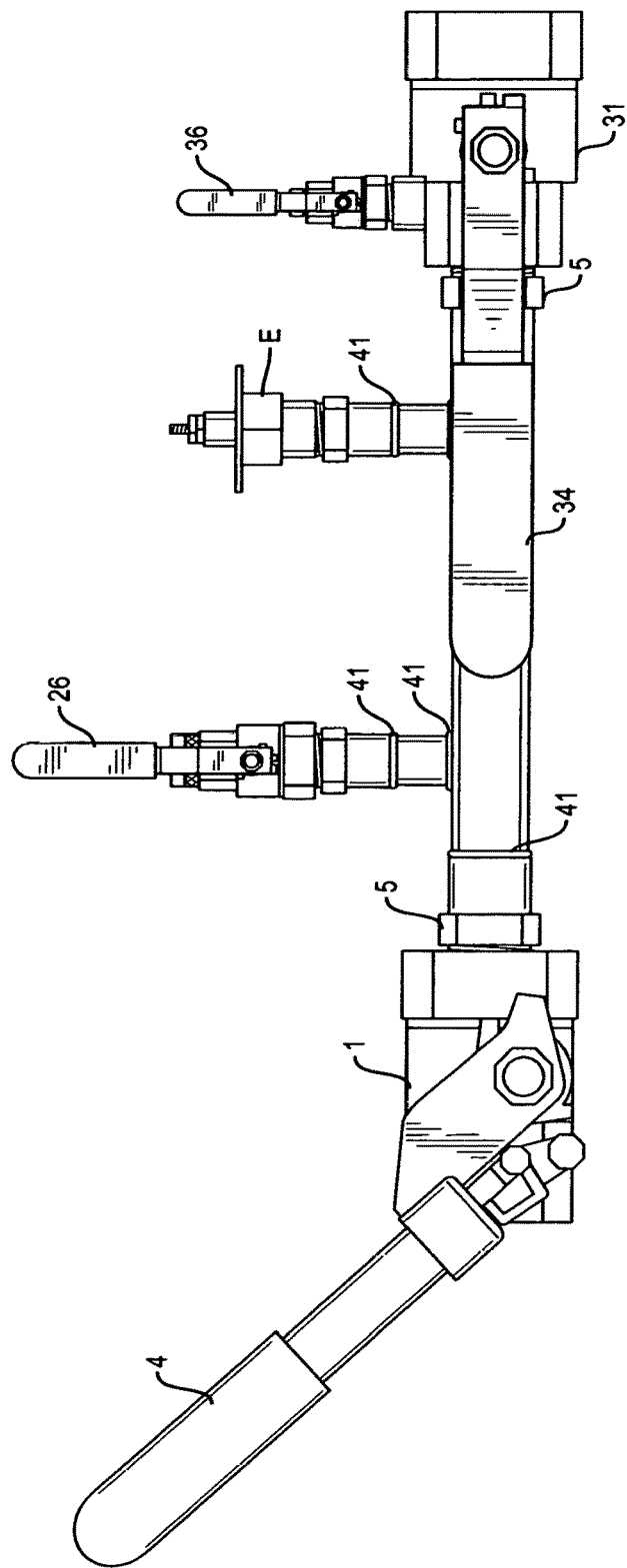
Figure 5:
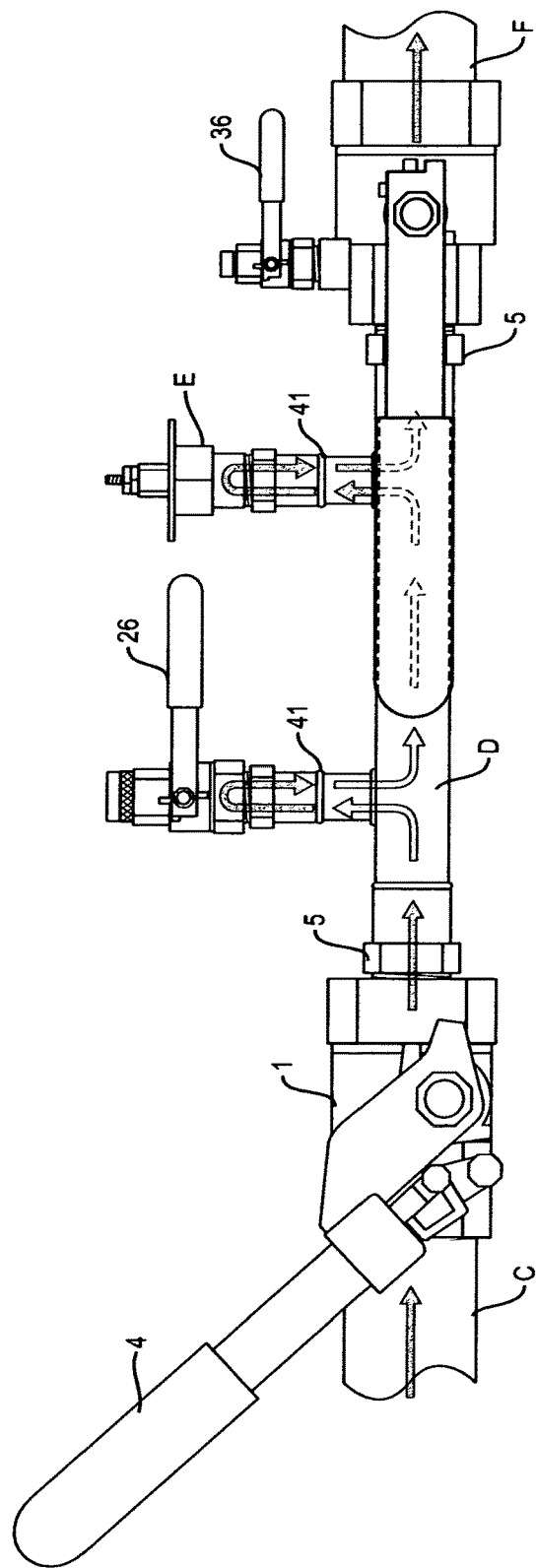
Figure 6:
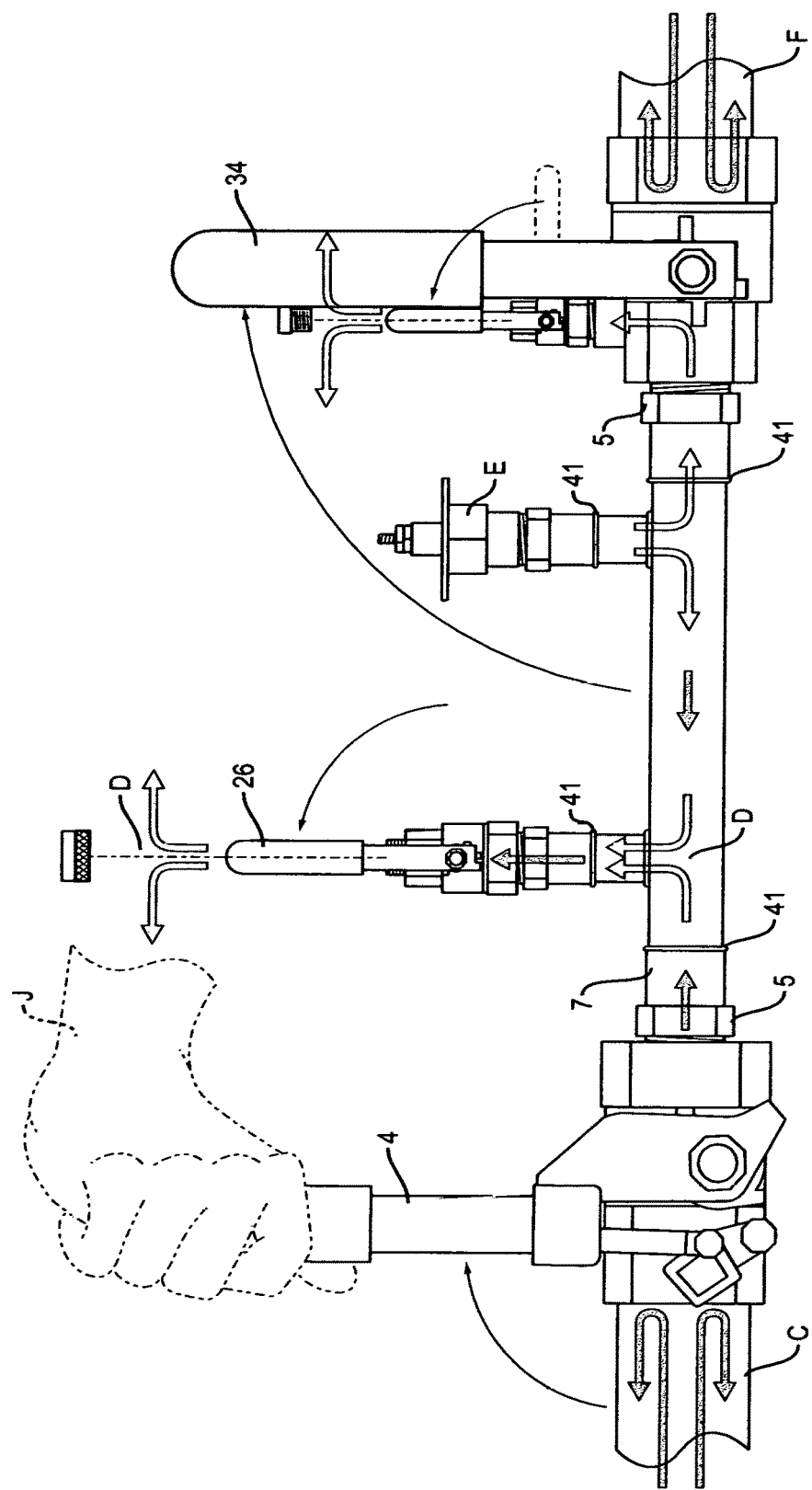
Figure 7:
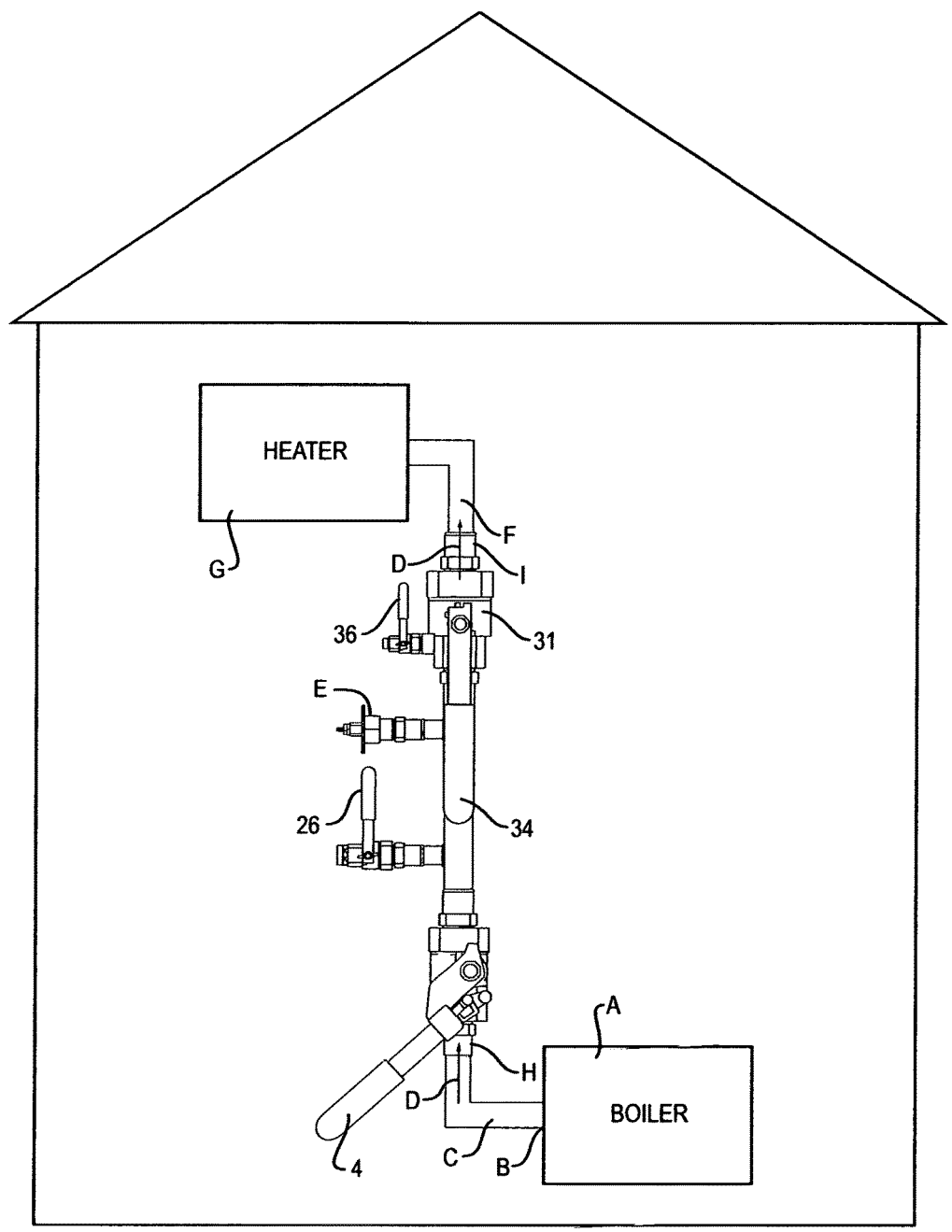
Figure 8:
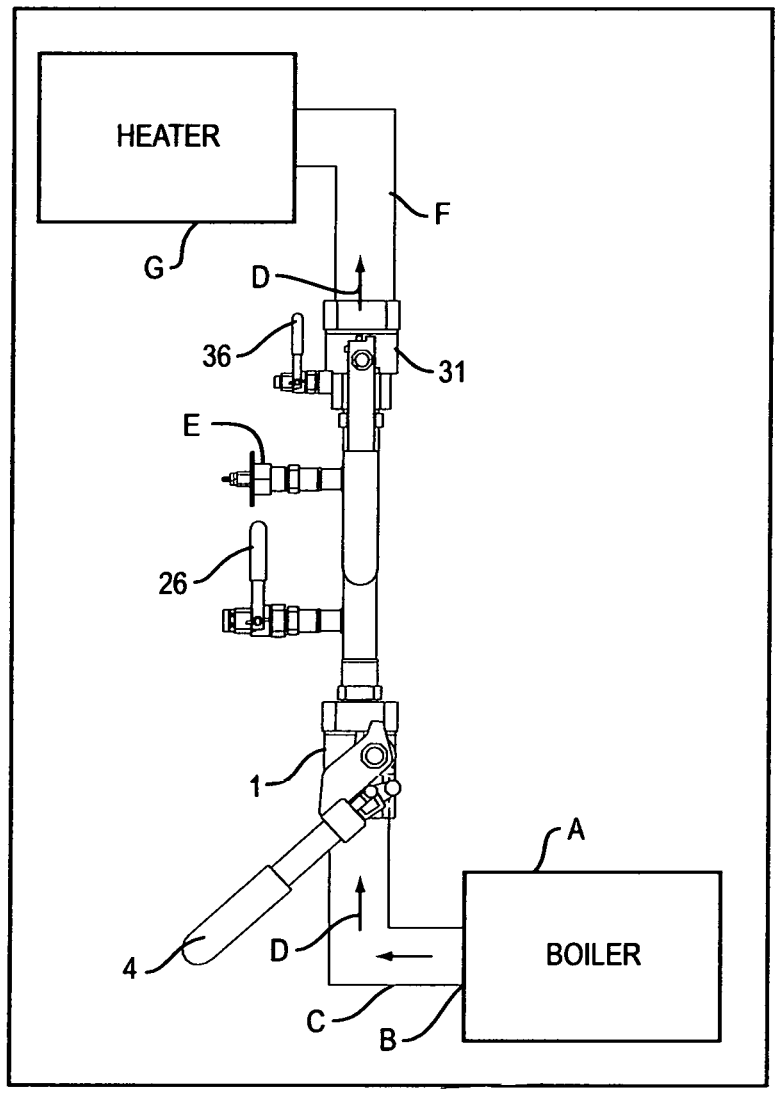

1. FIG. 1 is an exploded view of the invention.
2. FIG. 2 shows, in isolated plan view, the elongated body portion of the E-shaped piping unit of the invention.
3. FIG. 3 shows, in isolated perspective view, the E-shaped piping unit of the invention.
4. FIG. 4 is a view of the intact invention.
5. FIG. 5 is a view of the invention in an open state.
6. FIG. 6 is a view of the invention in a closed state.
7. FIG. 7 schematically depicts the invention present within a residential structure.
8. FIG. 8 schematically depicts the invention present within a commercial structure.

A DESCRIPTION OF THE PREFERRED EMBODIMENT

The most elemental embodiment of the invention can be appreciated with reference to FIGS. 1, 2 and 3. The elongated body portion 9, shown in FIG. 2 of the E-shaped piping unit 8, shown in FIG. 3 of the invention is characterized by the presence of two through holes 11 and 12 cut into body portion 9 and each are positioned adjacent but apart from one another in such a manner that they are bisected by a common horizontally inclined axis of symmetry 40 as seen in FIG. 2. Solder material 41 is utilized so a to thereby solder first stem portion 14 at inner end segment 15 thereof, at and about hole 11, to elongated body portion 9 as shown in FIG. 3. Solder material 41 is also utilized so as to thereby solder second stem portion 17 at inner end segment 18 thereof, at and about hole 12, to elongated body portion 9 also as shown in FIG. 3. FIG. 4 shows solder material 41 holding, via soldering, first end portion 21 of first small hollow adapter unit 20 to outer end segment 16 of first stem portion 14 with end segment 16 of stem portion 14 and end portion 21 of adapter unit 20 being seen as so signed in FIG. 1. Solder material 41 is utilized for all soldering in respect of all embodiments of the invention. FIG. 4 also shows solder material 41 holding via soldering, first end portion 29 of second small hollow adapter unit 28 to outer end segment 19 of second stem portion 17 and end portion 29 of adapter unit 28 being seen as so signed in FIG. 1. Adapter unit 20 and stem portion 14 are hollow throughout so as to accommodate the flowage of water D as seen in FIG. 5. Externally threaded second end portion 22 of adapter unit 20 serves to threadably receive internally threaded first end cavity portion 24 of small ball valve unit 23 as signed in FIG. 1 and shown in FIG. 4. Ball valve unit 23 is typically an APOLLO unit with unit number: 70-103-HC but could readily be any essentially similar ball valve unit 23. Ball valve unit 23 features an externally threaded second end cavity portion 25 and a ball valve handle component 26. Cavity portions 24 and 25 are in apposition to one another so as to form a channel allowing for the flowage of water D through each as can be appreciated with reference to FIG. 6 when handle 26 is in its fully open position as seen in FIG. 6. Internally threaded drain cap component 27 is threadably received by the external threading about externally threaded second end cavity portion 25. All of the foregoing signage is shown as well also in FIG. 1. Drain cap component 27 serves to impede fully any possible escape of water D from the invention in the event that handle component 26 is not in the fully closed position as shown in FIG. 5. Also second small adapter unit 28 has an internally threaded second end portion 30 that serves to receive external threading about the body portion a low water sensor unit E as can be appreciated with reference to FIGS. 1 and 4. Elongated body portion 9 of E-shaped piping unit 8 has first end segment 10 and second end segment 13. The above described most elemental embodiment of the invention is amenable to being soldered with solder material 41 at first end segment 10 into an internally threaded second end cavity portion 3 of a 2 piece threaded steel ball valve unit with spring return 1, typically, though not necessarily, an APOLLO unit with unit number: 71-506-08 and is further amenable to being soldered with solder material 41 at second end segment 13 into an internally threaded first end cavity portion 32 of a three way purge ball valve unit 31 typically, though not necessarily, an APOLLO unit with unit number: 77B-106-01. Such soldering can be resorted to as well as a means for soldering end segments 10 and 13 respectively into a second end cavity portion of a variant of unit 1 without internal threading and into a first end cavity portion of a variant of unit 31 without internal threading.

A less elemental embodiment of the invention is characterized by all of the foregoing features and additionally a pair of equivalent hollow main connector adapter units 5: first equivalent hollow main connector adapter unit 5 and second equivalent hollow main connector adapter unit 5, with each being characterized by the presence of an externally threaded first end portion 6 and a second end portion 7, both as seen in FIG. 1. With respect to this embodiment, second end portions 7 of each are soldered with solder material 41 respectively to end segments 10 and 13 as depicted in, e.g. FIG. 4. End portion 6 of first adapter unit 5 is threadably receivable by and connected within internally threaded second end cavity portion 3 of unit 1 and end portion 6 of second end adapter unit 5 is threadably receivable by and connected within internally threaded first end cavity portion 32 of unit 31 all as can be seen and appreciated with reference to FIGS. 1 and 4.

The preferred embodiment of the invention is however the above described less elemental embodiment indeed combined with a unit 1 and a unit 31 and assembled to a unit 1 and a unit 31 in the manner as noted just above.

The preferred embodiment of the invention is assembled as depicted in FIG. 4 as follows: The internally threaded second end cavity portion 3 of 2 piece threaded steel ball valve unit 1 is threadably connected to externally threaded first end portion 6 of the first main connector adapter unit 5. The second end portion 7 thereof is soldered to and about the first end segment 10 of E-shaped piping unit 8. Second end portion 7 of second main connector adapter unit 5 is soldered to and about second end segment 13 of E-shaped piping unit 8. Externally threaded first end portion 6 of second main connector adapter unit 5 is threadably connected within internally threaded first end cavity portion 32 of three way purge ball valve unit 31. Inner end segment 15 of first stem portion 14 of E-shaped piping unit 8 is soldered to the elongated body portion 9 thereof at and about first through hole 11 thereof. First end portion 21 of first small adapter unit 20 is soldered to and about outer end segment 16 of first stem portion 14. Externally threaded second end portion 22 of adapter unit 20 is threadably connected within internally threaded first end cavity portion 24 of ball valve unit 23. Ball valve unit 23 also has an externally threaded second end cavity portion 25. Internally threaded first drain cap component 27 in respect of ball valve unit 23 is threadably connectable to the external threading of second end cavity portion 25. Inner end segment 18 of second stem portion 17 is soldered to elongated body portion 9 of E-shaped piping unit 8 at and about second through hole 12 in body portion 9. First end portion 29 of second small adapter unit 28 is soldered to and about outer end segment 19 of second stem portion 17. Internally threaded second end portion 30 of second small adapter unit 28 is threadably connectable about the externally threaded body portion of a low water sensor unit E.

Within a commercial structure, initial piping C and outflow piping F are both typically made of iron and each have a diameter larger then the diameters of copper piping C and copper piping F as would be found within a residential structure. The fully assembled preferred embodiment of the invention is connected to initial piping C and outflow piping F found within a commercial structure, as follows. An externally threaded distal end section of relatively large diameter iron initial piping C is threadably connected within internally threaded first end cavity portion 2 of steel ball valve unit 1 with a proximal end section of piping C having been connected to a boiler unit A through a hole B in unit A. Similarly, the externally threaded proximal end section of relatively large diameter iron outflow piping F leading to, and connected at a distal end section thereof to that structure's heating system G is threadably connected within internally threaded second end cavity portion 33 of three way purge ball valve unit 31. It is then possible for water D to freely flow from a boiler unit A through initial piping C, to and within the invention, and, in turn, to and through outflow piping F and ultimately into heating system G when spring loaded ball valve handle component 4 of steel ball valve unit 1 and further ball valve handle component 34 of three way purge ball valve unit 31 are each in fully open positions, as can be noted with reference to FIGS. 5 and 8, provided however that ball valve handle component 26 of ball valve unit 23 as well as ancillary ball valve handle 36 of three way purge ball valve unit 31 are then each in fully closed positions, again as will be appreciated with reference to FIGS. 5 and 8. The fully assembled preferred embodiment of the invention for use, on the other hand, within a residential structure, equipped with copper piping C and copper piping F, is connected within internally threaded first end cavity portion 2 of unit 1 via external threading about an externally threaded first end portion of an adapter unit H, to that adapter unit and with unit H being equivalent to each adapter unit 5 of the invention. The second portion end of adapter unit H is then soldered to and about an unthreaded distal end section of such copper piping C which is, in turn, connected at a proximal end section thereof to and within a hole B within a boiler unit A as can be appreciated with reference to FIG. 7. Similarly, another adapter unit I equivalent to adapter unit H has an externally threaded first end portion that is threadably connected within internally threaded second end cavity portion 33 of three way purge ball valve unit 31. A second end portion of adapter unit I is then soldered to and about the unthreaded proximal end section of outflow piping F leading to and then connected at a distal end section thereof to that structure's heating system G. It is again then possible for water D to freely flow from boiler unit A through initial piping C to and within the invention, and; in turn to and through outflow piping F and ultimately into heating system G when ball valve handle component 4 and ball valve handle component 34 are in fully open positions with ball valve handle component 26 and ancillary ball valve handle 36 being then each in fully closed positions.

With respect to ball valve units 1, 23 and 31, the following recitations will serve to advance a clearer understanding in terms of their operation with respect to the purposes of the invention as described above. As regards unit 1, when handle component 4 is in what could be termed its default, fully open position and then being at an angle of some 45° or so relative to the lie of a horizontal long axis of symmetry of the body portion of unit 1 within which cavity portions 2 and 3 are located; the channeling as between cavity portions 2 and 3 is open, thereby permitting the flowage of water D through cavity portions 2 and 3 respectively. When however, handle component 4 is pulled from that position to a fully closed position being one at an angle of roughly 90° from the lie of the horizontal long axis of symmetry of the body portion of unit 1, this pulling causes a ball valve element portion of handle component 4 lying with in the channel formed by cavity portions 2 and 3 to rotate to a position within the body portion of unit 1 that serves to provide a complete barrier as between cavity portions 2 and 3 such that flowage of water D from cavity portion 2 to cavity portion 3 is then completely impeded. When again however, such pulling pressure is alleviated, then, handle component 4, being spring loaded, then simply springs back to its default position, a fully open position serving to once again allow the free flowage of water D through cavity portion 2 into cavity portion 3, whereas the ball valve element portion of handle component 4 would have then concomitantly, fully receded back down and away from its just previous fully closed, fully impeding position. The same operational principle serves to describe the impedance capabilities of that ball valve element portion of each of handle component 26 and handle component 34 as are each found respectively within the body portion of each of ball valve components 23 and 31 as well as, as respects the ball valve element portion of ancillary handle component 36 found within the ancillary body portion of three way purge ball valve unit 31 and that also houses fourth end cavity portion 37 and fifth end cavity portion 38 of unit 31. With respect to ball valve units 23 and 31, the fully open positions with respect to each are appreciated when handle components 26, 34 and ancillary handle component 36 respectively enjoy positional lies that are parallel to the lies of the respective horizontal long axes of symmetry to the body portions of each of ball valve units 23 and 31 as well as, as respects that of the ancillary body portion of ball valve unit 31 that houses fourth end cavity portion 37 and fifth end cavity portion 33. When handle component 26 is rotated through an angle of 90° as can be seen e.g., with reference to FIG. 5 in relation to FIG. 6, from fully open to fully closed, then a ball valve element portion of handle component 26 lying within channeling formed as between cavity portions 24 and 25, rotates to a position within the body portion of unit 23 that serves to provide a complete barrier as between portion 24 and portion 25 such that flowage of water D from cavity portion 24 into cavity portion 25 is completely impeded. The same principal of operation as regards rotation of ball valve element portions as connected to handle components 34 and 36 governs the complete impedance of water D flowing from first end cavity portion 32 to second end cavity portion 33 as respects handle component 34 and of water D flowing from fourth end cavity 37 to fifth end cavity 38 as respects ancillary handle component 36.

At this juncture it should be noted that the two equivalent main connector adapter units 5 of the invention are hollow throughout and are typically made of copper. Elongated body portion 9 and stem portions 14 and 17 are also hollow throughout and likewise typically made of copper. Finally, first small adapter unit 20 and second small adapter unit 28 are also hollow throughout and typically made of copper as well. However, these parts of the invention, being numbers 5, 9, 14, 17, 20 and 28 also known as fittings could be made up of other metals, as well, such as steel or alloys such as steel based alloys or e.g., also brass. The preferred embodiment of the invention as so fully assembled and directly connected, as noted above, to both initial piping C and outflow piping F or connected to an adapter H in turn connected to piping C and as well as to an adapter I, in turn connected to outflow piping F; is operated as follows for purposes of testing the operational integrity of a sensor unit E. A person who could be an insurance employee, a general safety specialist or even just a homeowner, can, with resort to the invention, readily and quickly perform such testing. The testing person does not need to be a master plumber although such testing as presently occurs, in the absence of the invention, typically requires the services of a master plumber. Such present testing is, at once, also notably time consuming as well as being not insubstantially quite expensive. On the other hand, a testing person J with resort to the invention, connected and functioning as earlier noted simply begins testing by way of manually rotating spring loaded ball valve component 4 from the fully open position seen in FIG. 5 to the fully closed position as seen in FIG. 6. While holding ball valve handle component 4 in such a closed position with one hand, the testing person J with the other hand moves ball valve handle component 26 from its fully closed position as shown in FIG. 5 to its fully open position as shown in FIG. 6. This maneuver impedes further flowage of water D from within piping C into second end cavity portion 3 from first end cavity portion 2 of unit 1 and also allows water D within first stem portion 14 and first small adapter unit 20 and first end cavity portion 24 of ball valve unit 23 to exude out from externally threaded second end cavity portion 25 of ball valve unit 23 after first drain cap component 27 would have been manually unthreaded therefrom. Then, while continuously maintaining valve handle component 4 in the closed position, the testing person rotates ball handle component 34 from its fully open position as seen in FIG. 5 to its fully closed position as seen in FIG. 6. Similarly, while continuing to manually hold valve handle component 4 in the fully closed position, the testing person then moves ancillary ball valve handle component 36 from its fully closed position as seen in FIG. 5 to its fully open position as seen in FIG. 6. The testing person then unthreads second drain cap component 39 thereby allowing water D to also seep out, from within the invention, through internally threaded fifth end cavity portion 38 once having emanated thereto from within first end cavity portion 32 of unit 31 and through internally threaded third end cavity portion 35 then into externally threaded fourth end cavity 37 thereof as can be noted with reference to FIG. 6. Very shortly, then the invention will be found to be wholly bereft of any water D whereas not only is ball valve handle component 4 being held fully closed, but also ball valve handle component 34 is similarly rotated to a fully closed position such that no water D can any longer enter second end cavity portion 3 of ball valve unit 1 nor can any water D backflow from outflow piping F through second end cavity portion 33 and into the invention, all as can be noted with reference to FIG. 6. At this juncture, a properly functioning sensor unit E will give off its low water alarm. On the other hand, a dysfunctional sensor unit E will give off no such alarm. Testing will then have been, very quickly, completed. At this juncture, if a sensor unit E has been shown to have become defective, its a simple matter to merely unthread sensor unit E from within the internally threaded second end portion 30 of second small adapter unit 28 and rethread therein, in its place, a new and properly functioning sensor unit E. With that, internally threaded first drain cap component 27 will then be rethreaded to externally threaded second end cavity portion 25 of ball valve unit 23. Ball valve handle component 26 will then be returned to its fully closed position. Then spring loaded ball valve handle component 4 will be let go of so as to then spring back to its previously fully open position. Water D will then commence filling the invention once again and air inside the invention that accumulated during testing will be expelled out through internally threaded fifth end cavity 38 and will be followed by some water D. Then internally threaded drain cap component 39 will be rethreaded into internally threaded fifth end cavity 38 after ball valve handle component 36 is rotated to the closed position and this maneuver is followed by rotating ball valve handle component 34 back to its fully open position. The invention will then be refilled with water D under pressure from boiler A and water D will then quickly make its way therefrom once again into outflow piping F and ultimately into heating system G and on its circulating way back to boiler unit A, all until, once again, at some future date, testing would be in need of being repeated. As can be noted with reference to the foregoing, such safety testing; by virtue of the presence of the invention fitted as described above between a structure's post-boiler piping C and F serving that structure's heating system G can very quickly and very economically be accomplished by virtually any one person as opposed to otherwise, as is currently the case, needing to have two persons, one a master plumber, having to, in a very time consuming manner, drain the structure's whole water system completely, test the sensor and then work to again, in a similarly very time consuming manner, undertake to then refill the whole system.

In conclusion, the present invention is not merely new, useful and unique; but rather instead, respectfully submitted, it is indeed veritably revolutionary in the art as regards the matter of low water sensor unit testing.

The invention claimed is:
1. A low water sensor testing apparatus comprising:
 a. a 2 piece threaded steel ball valve unit with spring return;
 b. said 2 piece threaded steel ball valve unit with spring return having an internally threaded first end cavity portion, an internally threaded second cavity portion and a spring loaded ball valve handle component;
 c. a first hollow main connector adapter unit;
 d. said first hollow main connector adapter unit having an externally threaded first end portion and an unthreaded second end portion;
 e. an E-shaped piping unit having an elongated body portion with a first through hole and a second through hole each cut within said body portion with each said through hole being bisected by one common, elongated surface axis of said body portion;
 f. a first end segment and a second end segment of said elongated body portion;
 g. a first stem portion of said E-shaped piping unit and having a first stem inner end segment and a first stem outer end segment;
 h. a second stem portion of said E-shaped piping unit and having a second stem inner end segment and second stem outer end segment;
 i. a second hollow main connector adapter unit;
 j. said second hollow main connector adapter unit having an externally threaded first end portion and an unthreaded second end portion;
 k. a first small hollow adapter unit with an unthreaded first end portion and an externally threaded second end portion;
 l. a small ball valve unit having an internally threaded first end cavity portion and an externally threaded second end cavity portion and a ball valve handle component;
 m. a second small hollow adapter unit having an unthreaded first end portion and an internally threaded second end portion;
 n. a three way purge ball valve unit having an internally threaded first end cavity portion, an internally threaded second end cavity portion, a first ball valve handle component, an internally threaded third end cavity portion, an externally threaded fourth end cavity portion, an ancillary ball valve handle component, and an internally threaded fifth end cavity portion;
 o. said externally threaded first end portion of said first hollow main connector adapter unit being threadably connected within said internally threaded second end cavity portion of said 2 piece threaded ball valve unit with spring return;
 p. said unthreaded second end portion of said first hollow main connector adapter unit being soldered to and about said first end segment of said elongated body portion of said E-shaped piping unit;
 q. said first stem inner end segment being soldered to said elongated body portion of said E-shaped piping unit at and about said first through hole cut within said body portion;
 r. said first stem outer end segment being soldered to and within said unthreaded first end portion of said first small hollow adapter unit;
 s. said small ball valve unit being threadably connected via said internally threaded first end cavity portion thereof to said externally threaded second end portion of said first small hollow adapter unit;
 t. said second stem inner end segment being soldered to said elongated body portion of said E-shaped piping unit at and about said second through hole cut within said body portion;
 u. said second stem outer end segment being soldered to and within said unthreaded first end portion of said second small hollow adapter unit;
 v. said internally threaded second end portion of said second small hollow adapter unit serving to threadably hold a low water sensor unit via external threading about a body portion of said sensor unit;
 w. said second end segment of said elongated body portion of said E-shaped piping unit being soldered to and within said unthreaded second end portion of said second hollow main connector adapter unit;
 x. said externally threaded first end portion of said second hollow main connector adapter unit being threadably connected within said internally threaded first end cavity portion of said three way purge ball valve unit;

y. said internally threaded first end cavity portion of said 2 piece threaded steel ball valve unit with spring return being amenable to being threadably connected with the externally threaded distal end portion of initial piping connected within a hole found within a building structure's hot water boiler unit, and;

z. said internally threaded second end cavity portion of said three way purge ball valve unit being amenable to being threadably connected with the externally threaded proximal end portion of outflow piping leading to said building structure's heating system.

2. The low water sensor testing apparatus of claim 1, whereby an internally threaded first drain cap component is threadably connected about and to said externally threaded second end cavity portion of said small ball valve unit.

3. The low water sensor testing apparatus of claim 1, whereby an externally threaded drain cap component is threadably receivable within said threaded fifth end cavity portion of said three way purge ball valve unit.

4. The low water sensor testing apparatus of claim 1, whereby said 2 piece threaded steel ball valve unit with spring return is an APOLLO® unit with unit number: 71-506-08.

5. The low water sensor testing apparatus of claim 1, whereby said small ball valve unit is an APOLLO® unit with unit number: 70-103-HC.

6. The low water sensor testing apparatus of claim 1, whereby said three way purge ball valve unit is an APOLLO® unit with unit number: 77B-106-01.

7. A low water sensor testing apparatus comprising:

a. a 2 piece threaded steel ball valve unit with spring return;

b. said 2 piece threaded steel ball valve unit with spring return having an internally threaded first end cavity portion, an internally threaded second cavity portion and a spring loaded ball valve handle component;

c. a first hollow main connector adapter unit;

d. said first hollow main connector adapter unit having an externally threaded first end portion and an unthreaded second end portion;

e. an E-shaped piping unit having an elongated body portion with a first through hole and a second through hole each cut within said body portion with each said through hole being bisected by one common, elongated surface axis of said body portion;

f. a first end segment and a second end segment of said elongated body portion;

g. a first stem portion of said E-shaped piping unit and having a first stem inner end segment and a first stem outer end segment;

h. a second stem portion of said E-shaped piping unit and having a second stem inner end segment and second stem outer end segment;

i. a second hollow main connector adapter unit;

j. said second hollow main connector adapter unit having an externally threaded first end portion and an unthreaded second end portion;

k. a first small hollow adapter unit with an unthreaded first end portion and an externally threaded second end portion;

l. a small ball valve unit having an internally threaded first end cavity portion and an externally threaded second end cavity portion and a ball valve handle component;

m. a second small hollow adapter unit having an unthreaded first end portion and an internally threaded second end portion;

n. a three way purge ball valve unit having an internally threaded first end cavity portion, an internally threaded second end cavity portion, a first ball valve handle component, an internally threaded third end cavity portion, an externally threaded fourth end cavity portion, an ancillary ball valve handle component, and an internally threaded fifth end cavity portion;

o. said externally threaded first end portion of said first hollow main connector adapter unit being threadably connected within said internally threaded second end cavity portion of said 2 piece threaded ball valve unit with spring return;

p. said unthreaded second end portion of said first hollow main connector adapter unit being soldered to and about said first end segment of said elongated body portion of said E-shaped piping unit;

q. said first stem inner end segment being soldered to said elongated body portion of said E-shaped piping unit at and about said first through hole cut within said body portion;

r. said first stem outer end segment being soldered to and within said unthreaded first end portion of said first small hollow adapter unit;

s. said small ball valve unit being threadably connected via said internally threaded first end cavity portion thereof to said externally threaded second end portion of said first small hollow adapter unit;

t. said second stem inner end segment being soldered to said elongated body portion of said E-shaped piping unit at and about said second through hole cut within said body portion;

u. said second stem outer end segment being soldered to and within said unthreaded first end portion of said second small hollow adapter unit;

v. said internally threaded second end portion of said second small hollow adapter unit serving to threadably hold a low water sensor unit via external threading about a body portion of said sensor unit;

w. said second end segment of said elongated body portion of said E-shaped piping unit being soldered to and within said unthreaded second end portion of said second hollow main connector adapter unit;

x. said externally threaded first end portion of said second hollow main connector adapter unit being threadably connected within said internally threaded first end cavity portion of said three way purge ball valve unit;

y. said internally threaded first end cavity portion of said 2 piece threaded steel ball valve unit with spring return being amenable to being threadably connected with the externally threaded first end portion of a hollow adapter unit, the other end portion of which is, in turn, soldered to the distal end portion of initial piping also connected within a hole found within a building structure's hot water boiler unit, and;

z. said internally threaded second end cavity portion of said three way purge ball valve unit being amenable to being threadably connected with the externally threaded first end portion of a hollow adapter unit, the other end portion of which said hollow adapter unit is, in turn, soldered to the proximal end of outflow piping leading to said building structure's heating system.

8. The low water sensor testing apparatus of claim 7, whereby an internally threaded first drain cap component is threadably connected about and to said externally threaded second end cavity portion of said small ball valve unit.

9. The low water sensor testing apparatus of claim 7, whereby an externally threaded drain cap component is threadably receivable within said threaded fifth end cavity portion of said three way purge ball valve unit.

10. The low water sensor testing apparatus of claim 7, whereby said 2 piece threaded steel ball valve unit with spring return is an APOLLO® unit with unit number: 71-506-08.

11. The low water sensor testing apparatus of claim 7, whereby said small ball valve unit is an APOLLO® unit with unit number: 70-103-HC.

12. The low water sensor testing apparatus of claim 7, whereby said three way purge ball valve unit is an APOLLO® unit with unit number: 77B-106-01.

13. A low water sensor testing apparatus comprising:
 a. a 2 piece threaded steel ball valve unit with spring return;
 b. said 2 piece threaded steel ball valve unit with spring return having an internally threaded first end cavity portion, an internally threaded second cavity portion and a spring loaded ball valve handle component;
 c. an E-shaped piping unit having an elongated body portion with a first through hole and a second through hole each cut within said body portion with each said through hole being bisected by one common, elongated surface axis of said body portion;
 d. a first end segment and a second end segment of said elongated body portion;
 e. a first stem portion of said E-shaped piping unit and having a first stem inner end segment and a first stem outer end segment;
 f. a second stem portion of said E-shaped piping unit and having a second stem inner end segment and a second stem outer end segment;
 g. a first small hollow adapter unit with an unthreaded first end portion and an externally threaded second end portion;
 h. a small ball valve unit having an internally threaded first end cavity portion and an externally threaded second end cavity portion and a ball valve handle component;
 i. a second small hollow adapter unit having an unthreaded first end portion and an internally threaded second end portion;
 j. a three way purge ball valve unit having an internally threaded first end cavity portion, an internally threaded second end cavity portion, a first ball valve handle component, an internally threaded third end cavity portion, an externally threaded fourth end cavity portion, an ancillary ball valve handle component and, an internally threaded fifth end cavity portion;
 k. said first stem inner end segment being soldered to said elongated body portion of said E-shaped piping unit at and about said first through hole cut within said body portion;
 l. said first stem outer end segment being soldered to and within said unthreaded first end portion of said first small hollow adapter unit;
 m. said small ball valve unit being threadably connected via said internally threaded first end cavity portion thereof to said externally threaded second end portion of said first small hollow adapter unit;
 n. said second stem inner end segment being soldered to said elongated body portion of said E-shaped piping unit at and about said second through hole cut within said body portion;
 o. said second stem outer end segment being soldered to and within said unthreaded first end portion of said second small hollow adapter unit;
 p. said internally threaded second end portion of said second small hollow adapter unit serving to threadably hold a low water sensor unit via external threading about a body portion of said sensor unit;
 q. said first end segment of said elongated body portion of said E-shaped piping unit being soldered to and within said second end cavity portion of said 2 piece threaded steel ball valve unit;
 r. said second end segment of said elongated body portion of said E-shaped piping unit being soldered to and within said first end cavity portion of said three way purge ball valve unit;
 s. said internally threaded first end cavity portion of said 2 piece threaded steel ball valve unit with spring return being amenable to being threadably connected with the externally threaded distal end portion of initial piping connected within a hole found within a building structure's hot water boiler unit, and;
 t. said internally threaded second end cavity portion of said three way purge ball valve unit being amenable to being threadably connected with the externally threaded proximal end portion of outflow piping leading to said building structure's heating system.

14. The low water sensor testing apparatus of claim 13, whereby an internally threaded first drain cap component is threadably connected about and to said externally threaded second end cavity portion of said small ball valve unit.

15. The low water sensor testing apparatus of claim 13, whereby an externally threaded drain cap component is threadably receivable within said threaded fifth end cavity portion of said three way purge ball valve unit.

16. The low water sensor testing apparatus of claim 13, whereby said 2 piece threaded steel ball valve unit with spring return is an APOLLO® unit with unit number: 71-506-08.

17. The low water sensor testing apparatus of claim 13, whereby said small ball valve unit is an APOLLO® unit with unit number: 70-103-HC.

18. The low water sensor testing apparatus of claim 13, whereby said three way purge ball valve unit is an APOLLO® unit with unit number: 77B-106-01.

19. A low water sensor testing apparatus comprising:
 a. a 2 piece threaded steel ball valve unit with spring return;
 b. said 2 piece threaded steel ball valve unit with spring return having an internally threaded first end cavity portion, an internally threaded second cavity portion and a spring loaded ball valve handle component;
 c. an E-shaped piping unit having an elongated body portion with a first through hole and a second through hole each cut within said body portion with each said through hole being bisected by one common, elongated surface axis of said body portion;
 d. a first end segment and a second end segment of said elongated body portion;
 e. a first stem portion of said E-shaped piping unit and having a first stem inner end segment and a first stem outer end segment;

f. a second stem portion of said E-shaped piping unit and having a second stem inner end segment and a second stem outer end segment;
g. a first small hollow adapter unit with an unthreaded first end portion and an externally threaded second end portion;
h. a small ball valve unit having an internally threaded first end cavity portion and an externally threaded second end cavity portion and a ball valve handle component;
i. a second small hollow adapter unit having an unthreaded first end portion and an internally threaded second end portion;
j. a three way purge ball valve unit having an internally threaded first end cavity portion, an internally threaded second end cavity portion, a first ball valve handle component, an internally threaded third end cavity portion, an externally threaded fourth end cavity portion, an ancillary ball valve handle component and, an internally threaded fifth end cavity portion;
k. said first stem inner end segment being soldered to said elongated body portion of said E-shaped piping unit at and about said first through hole cut within said body portion;
l. said first stem outer end segment being soldered to and within said unthreaded first end portion of said first small hollow adapter unit;
m. said small ball valve unit being threadably connected via said internally threaded first end cavity portion thereof to said externally threaded second end portion of said first small hollow adapter unit;
n. said second stem inner end segment being soldered to said elongated body portion of said E-shaped piping unit at and about said second through hole cut within said body portion;
o. said second stem outer end segment being soldered to and within said unthreaded first end portion of said second small hollow adapter unit;
p. said internally threaded second end portion of said second small hollow adapter unit serving to threadably hold a low water sensor unit via external threading about a body portion of said sensor unit;
q. said first end segment of said elongated body unit of said E-shaped piping unit being soldered to and within said second end cavity portion of said 2 piece threaded steel ball valve unit;
r. said second end segment of said elongated body portion of said E-shaped piping unit being soldered to and within said first end cavity portion of said three way purge ball valve unit;
s. said internally threaded first end cavity portion of said 2 piece threaded steel ball valve unit with spring return being amenable to being threadably connected with the externally threaded first end portion of a hollow adapter unit, the other end portion of which is, in turn, soldered to the distal end portion of initial piping also connected within a hole found within a building structure's hot water boiler unit, and;
t. said internally threaded second end cavity portion of said three way purge ball valve unit being amenable to being threadably connected with the externally threaded first end portion of a hollow adapter unit, the other end portion of which said hollow adapter unit is, in turn, soldered to the proximal end of outflow piping leading to said building structure's heating system.

20. The low water sensor testing apparatus of claim 19, whereby an internally threaded first drain cap component is threadably connected about and to said externally threaded second end cavity portion of said small ball valve unit.

21. The low water sensor testing apparatus of claim 19, whereby an externally threaded drain cap component is threadably receivable within said threaded fifth end cavity portion of said three way purge ball valve unit.

22. The low water sensor testing apparatus of claim 19, whereby said 2 piece threaded steel ball valve unit with spring return is an APOLLO® unit with unit number: 71-506-08.

23. The low water sensor testing apparatus of claim 19, whereby said small ball valve unit is an APOLLO® unit with unit number: 70-103-HC.

24. The low water sensor testing apparatus of claim 19, whereby said three way purge ball valve unit is an APOLLO® unit with unit number: 77B-106-01.

25. A low water sensor testing apparatus comprising:
a. a first hollow main connector adapter unit;
b. said first hollow main connector adapter unit having an externally threaded first end portion and an unthreaded second end portion;
c. an E-shaped piping unit having an elongated body portion with a first through hole and a second through hole each cut within said body portion with each said through hole being bisected by one common, elongated surface axis of said body portion;
d. a first end segment and a second end segment of said elongated body portion;
e. a first stem portion of said E-shaped piping unit and having a first stem inner end segment and a first stem outer end segment;
f. a second stem portion of said E-shaped piping unit and having a second stem inner end segment and second stem outer end segment;
g. a second hollow main connector adapter unit;
h. said second hollow main connector adapter unit having an externally threaded first end portion and an unthreaded second end portion;
i. a first small hollow adapter unit with an unthreaded first end portion and an externally threaded second end portion;
j. a small ball valve unit having an internally threaded first end cavity portion and an externally threaded second end cavity portion and a ball valve handle component;
k. a second small hollow adapter unit having an unthreaded first end portion and an internally threaded second end portion;
l. said externally threaded first end portion of said first hollow main connector adapter unit being threadably connected within an internally threaded second end cavity portion of a 2 piece threaded ball valve unit with spring return;
m. said unthreaded second end portion of said first hollow main connector adapter unit being soldered to and about said first end segment of said elongated body portion of said E-shaped piping unit;
n. said first stem inner end segment being soldered to said elongated body portion of said E-shaped piping unit at and about said first through hole cut within said body portion;
o. said first stem outer end segment being soldered to and within said unthreaded first end portion of said first small hollow adapter unit;
p. said small ball valve unit being threadably connected via said internally threaded first end cavity portion thereof to said externally threaded second end portion of said first small hollow adapter unit;

q. said second stem inner end segment being soldered to said elongated body portion of said E-shaped piping unit at and about said second through hole cut within said body portion;
r. said second stem outer end segment being soldered to and within said unthreaded first end portion of said second small hollow adapter unit;
s. said internally threaded second end portion of said second small hollow adapter unit serving to threadably hold a low water sensor unit via external threading about a body portion of said sensor unit;
t. said second end segment of said elongated body portion of said E-shaped piping unit being soldered to and within said unthreaded second end portion of said second hollow main connector adapter unit, and;
u. said externally threaded first end portion of said second hollow adapter unit being threadably connected within an internally threaded first end cavity portion of a three way purge ball valve unit.

26. The low water sensor testing apparatus of claim 25 whereby an internally threaded first drain cap component is threadably connected about and to said externally threaded second end cavity portion of said ball valve unit.

27. A low water sensor testing apparatus comprising:
a. an E-shaped piping unit having an elongated body portion with a first through hole and a second through hole each cut within said body portion with each said through hole being bisected by one common elongated surface axis of said body portion;
b. a first end segment and a second end segment of said elongated body portion;
c. a first stem portion of said E-shaped piping unit and having a first stem inner end segment and a first stem outer end segment;
d. a second stem portion of said E-shaped piping unit and having a second stem inner end segment and second stem outer end segment;
e. a first small hollow adapter unit with an unthreaded first end portion and an externally threaded second end portion;
f. a small ball valve unit having an internally threaded first end cavity portion and an externally threaded second end cavity portion and a ball valve handle component;
g. a second small hollow adapter unit having an unthreaded first end portion and an internally threaded second end portion;
h. said first stem inner end segment being soldered to said elongated body portion of said E-shaped piping unit at and about said first through hole cut within said body portion;
i. said first stem outer end segment being soldered to and within said unthreaded first end portion of said first small hollow adapter unit;
j. said small ball valve unit being threadably connected via said internally threaded first end cavity portion thereof to said externally threaded second end portion of said first small hollow adapter unit;
k. said second stem inner end segment being soldered to said elongated body portion of said E-shaped piping unit at and about said second through hole cut within said body portion;
l. said second stem outer end segment being soldered to and within said unthreaded first end portion of said second small hollow adapter unit;
m. said internally threaded second end portion of said second small hollow adapter unit serving to threadably hold a low water sensor unit via external threading about a body portion of said sensor unit;
n. said first end segment of said elongated body portion of said E-shaped piping unit being amenable to being soldered to and within a second end cavity portion of a 2 piece threaded steel ball valve unit with spring return, and;
o. said second end segment of said elongated body portion of said E-shaped piping unit being amenable to being soldered to and within a first end cavity portion of a three way purge ball valve unit.

28. The low water sensor testing apparatus of claim 27, whereby an internally threaded first drain cap component is threadably connected about and to said externally threaded second end cavity portion of said small ball valve unit.

* * * * *